United States Patent [19]

Peuterbaugh

[11] Patent Number: 5,066,178
[45] Date of Patent: * Nov. 19, 1991

[54] DRAW BAR ADAPTER STRUCTURE FOR AND METHOD OF SECURING A TOOL TO A SPINDLE

[75] Inventor: Bruce G. Peuterbaugh, Mt. Clemens, Mich.

[73] Assignee: J. P. Tool, Inc., Warren, Mich.

[ * ] Notice: The portion of the term of this patent subsequent to Apr. 19, 2003 has been disclaimed.

[21] Appl. No.: 379,254

[22] Filed: May 17, 1982

[51] Int. Cl.$^5$ ............................ B23C 5/26; B23Q 3/12
[52] U.S. Cl. .................................. 409/233; 408/239 R
[58] Field of Search ................ 409/232, 233, 234; 408/239 R, 239 A, 238; 279/8

[56] References Cited

U.S. PATENT DOCUMENTS

| | | | |
|---|---|---|---|
| 2,685,823 | 8/1954 | Kaiser | 279/8 X |
| 3,118,345 | 1/1964 | Bullard et al. | 409/233 |
| 3,730,637 | 5/1973 | Cellini | 409/232 |
| 3,818,797 | 6/1914 | Zettler | 408/239 R X |
| 3,975,984 | 8/1976 | Simmons | 408/239 R |
| 4,122,755 | 10/1978 | Johnson et al. | 408/239 A |

FOREIGN PATENT DOCUMENTS

| | | | |
|---|---|---|---|
| 119345 | 9/1981 | Japan | 408/239 A |
| 379336 | 7/1973 | U.S.S.R. | 408/239 R |
| 920879 | 3/1963 | United Kingdom | 408/239 R |

Primary Examiner—William R. Briggs
Attorney, Agent, or Firm—Basile & Hanlon

[57] ABSTRACT

Adapter structure for and method of securing a draw bar actuated tool to a spindle having an actuating draw bar extending therethrough. The structure includes coupling members for securing the adapter structure to the actuating draw bar and to the tool draw bar and structure permitting relative rotation between the tool and spindle with the actuating draw bar and tool draw bar securely engaged. In one embodiment, the adapter structure is entirely separate from the tool while in another embodiment, the adapter structure includes a modified tool and tool draw bar.

The method of the invention includes the steps of securing a tool including a tool draw bar therein to an actuating draw bar extending through a spindle, rotating the tool and tool draw bar with respect to the actuating draw bar to align securing means on the spindle and tool without relative axial movement between the draw bars and subsequently securing the tool to the spindle.

13 Claims, 2 Drawing Sheets

DRAW BAR ADAPTER STRUCTURE FOR AND METHOD OF SECURING A TOOL TO A SPINDLE

BACKGROUND OF THE INVENTION

1. Field of the Invention

The invention relates grooving tools, boring heads and the like including a tool draw bar for actuating the tool which are intended to be secured to spindles for rotation therewith and actuated by an actuating bar extending through the spindle and connected to the tool draw bar and refers more specifically to draw bar adapter structure adapted to be positioned between the actuating draw bar and the tool draw bar to permit rapid securing of the tool to the spindle and the method of securing the tool to the spindle without a requirement for exact tolerances and positioning of the spindle, draw bars and tool to produce exact angular relationship between the tool and spindle with the draw bars tightly connected.

2. Description of the Prior Art

In the past, tools such as grooving tools, boring heads and the like having tool draw bars and adapted to be mounted on rotatable spindles having actuating draw bars extending therethrough with the draw bars connected have been mounted on the spindles by first rotating the tool with a threaded connection between the tool draw bar and actuating draw bar in engagement until the connection between the draw bars is secure. At such time, the tool is then backed off by reverse rotation until the proper angular relation between the tool and spindle is obtained so that securing means such as bolts may be passed through the tool into threaded securing openings in the end of the spindle. Such mounting of tools on spindles is unsatisfactory in that the draw bars are only rarely secured together as tightly as desired.

Wherein, in the past, it has been possible to secure the draw bars together as tightly as possible, exact tolerances have been required in the actuating draw bar or the tool draw bar to insure the exact alignment of the securing means at the exact moment the draw bars are secured together as desired. Such exact tolerances are difficult to maintain and are expensive to produce.

SUMMARY OF THE INVENTION

In accordance with the invention, a special draw bar adapter structure and method are provided to permit securing of a tool to a spindle with a tool draw bar secured to an actuating draw bar extending through the spindle without requirements for particular tolerances. The structure may be a separate draw bar adapter or may be a draw bar adapter operable in conjunction with a modified tool and tool draw bar.

The separate draw bar adapter includes a first coupling member adapted to be secured to the end of a draw bar, a second coupling member adapted to be secured to the first coupling member and to provide therebetween an annular recess, a bolt extending through the second coupling member and adapted to be engaged with the tool draw bar having a non-circular within the annular recess and a pin extending across the annular recess through the second coupling member which in cooperation with the non-circular head on the bolt within the annular recess permits limited angular movement of the bolt with no relative axial movement between the bolt and coupling members.

The second embodiment of the adapter structure of the invention includes a first coupling member again adapted to be secured to an actuating draw bar and having non-circular headed end thereon and a modified tool draw bar including an annular recess therein for receiving the non-circular head of the coupling member and a keeper member adapted to be secured to the tool for securing the head of the adapter member within the annular groove without permitting axial movement between the coupling member and tool draw bar while permitting limited relative angular movement therebetween.

The method of the invention includes the steps of first tightly securing the tool draw bar to the actuating draw bar, rotating the tool relative to the spindle without loosening the connection therebetween to place the tool and spindle in a desired relative angular position and subsequently securing the tool to the spindle in the desired relative angular position.

DESCRIPTION OF THE PREFERRED EMBODIMENT

Figure 1:
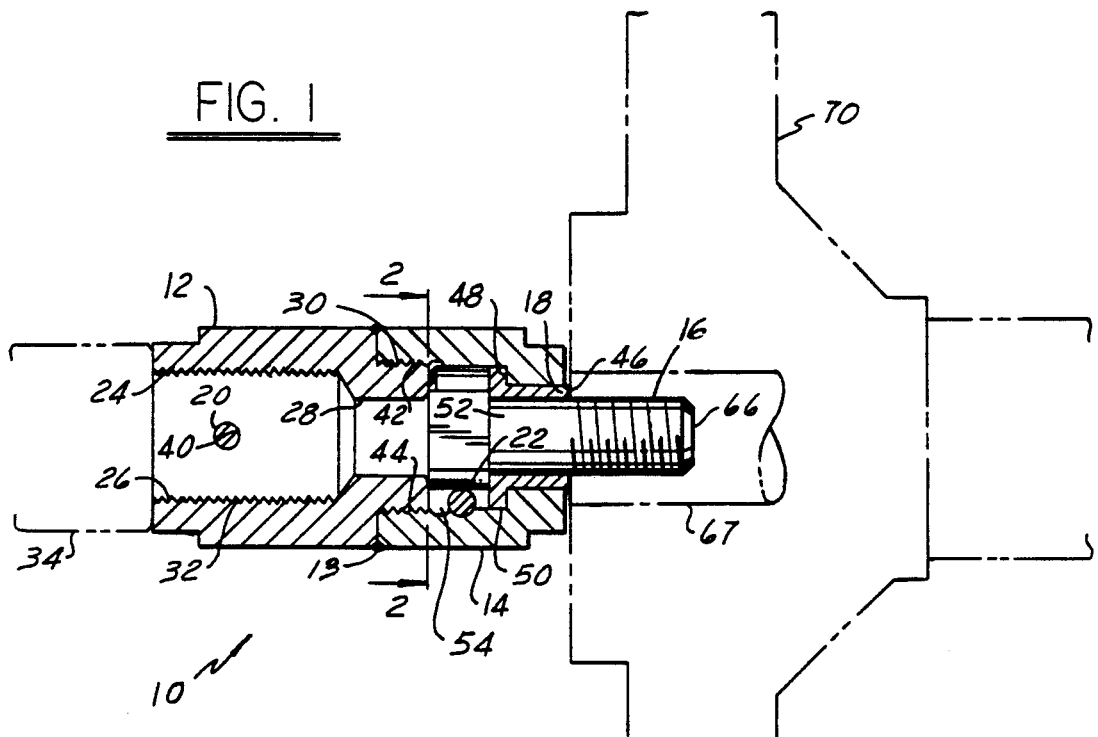
FIG. 1 is a longitudinal section view of the draw bar adapter structure of the invention for practicing the method of the invention.
Figure 2:
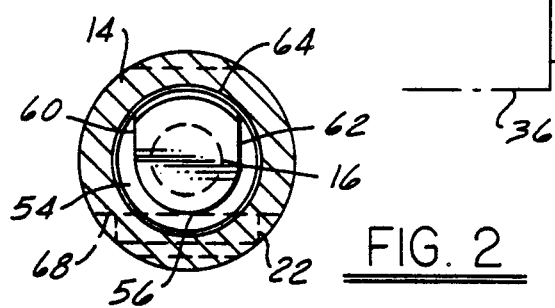
FIG. 2 is a cross-section of the structure illustrated in FIG. 1 taken substantially on the line 2—2 in FIG. 1.

The embodiment 10 of the separate draw bar adapter of the invention shown in FIG. 1 includes a first coupling member 12 a second coupling member 14 a headed bolt 16, bushing 18 and pins 20 and 22.

More specifically, the coupling member 12 is generally cylindrical including the central passage 24 extending therethrough having a larger diameter internally threaded end 26 and a smaller diameter unthreaded end 28. Coupling member 12 further has the reduced diameter externally threaded outer end 30 and the transversely extending openings 40 therethrough.

As shown in FIG. 1 in assembly, the coupling member 12 is threaded on the end 32 of an actuating bar 34 which may extend along the axis of rotation of a spindle 36. The coupling member 12 is secured in a fixed position on the draw bar 34 by means of pin 20 extending through 40 in the coupling member 12 and threaded end 32 of the actuating draw bar 34.

Coupling member 14 is again generally cylindrical and has a bore 42 extending therethrough with a threaded end 44 and a reduced diameter unthreaded end 46. An annular abutment 48 is provided between the larger diameter portion 44 and the smaller diameter portion 46 of the bore 42 as shown best in FIG. 1.

In assembly, the coupling member 14 is secured to the coupling member 12 by engagement of the threaded outer diameter end 30 of the coupling member 12 and the threaded inner diameter end 44 of the coupling member 14. After assembly, the coupling member 14 may be tack welded to the coupling member 12 as shown in FIG. 1 at 13.

The bushing 18 is generally cylindrical and includes the radially outwardly extending flange 50 on the end 52 thereof. In assembly, the bushing 18 extends through the smaller diameter portion 46 of the bore 42 through the coupling member 14. Thus, a generally annular chamber 54 is provided between the coupling member 14, the end of the coupling member 12 and the end of the bushing 18.

Figure 3:
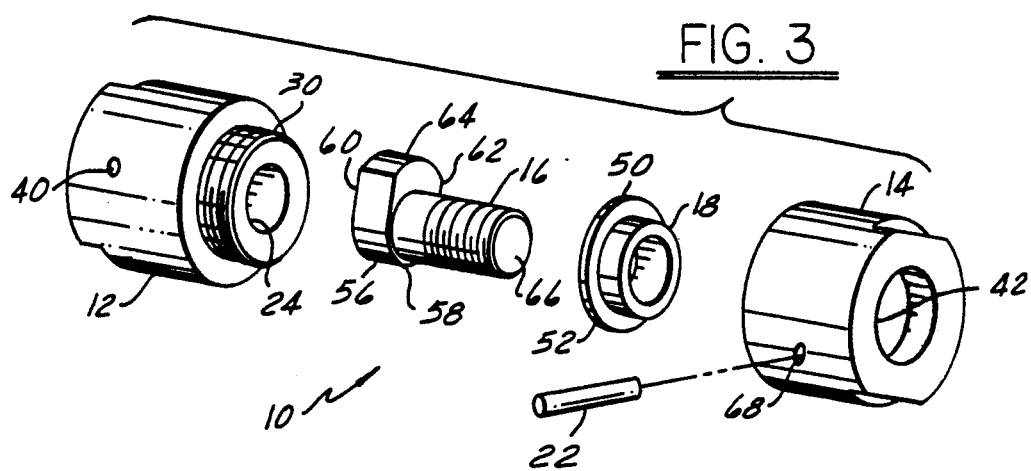
FIG. 3 is an exploded perspective view of the draw bar adapter structure of the invention.

The bolt 16 as shown best in FIG. 3 includes a head 56 having one diameter over substantially 180° of arc which head then extends in parallel portions 60 and 62 to a larger diameter portion.

In assembly, as shown best in FIG. 1, the bolt 16 is positioned with the head 56 within the recess 54 and with the end 66 thereof threadedly engaged with the tool draw bar 67.

Pin 22 extends transversely of the coupling member 14 through the opening 68 therethrough across the annular recess 54. Pin 22 crosses the recess 54 substantially at the smaller diameter of the head 56 of the bolt 16 in assembly, the pin 22 thus limits the rotational movement of the bolt 16 in the recess 54, to substantially 180°.

In use of the separate draw bar adapter 10, the adapter 10 is secured to the actuating draw bar 34 assembled as shown in FIG. 1, by means of pin 20. The tool 70 is then secured to the draw bar adapter 10 by rotating the tool 70 to thread the bolt 16 into tool draw bar 67. For purposes of such assembly, the actuating draw bar 34 and the work tool draw bar 67 may be extended.

When the tool draw bar 67 and adapter structure 10 are firmly secured together, with the tool draw bar in engagement with the end of bushing 18 and a gap between the end of coupling member 14 and tool 70, the tool 70 may be reversely rotated over substantially 180° without loosening the connection between the adapter 10 and tool draw bar 67 so that the tool 70 may be aligned with means to secure the tool 70 to spindle 36. Accordingly, the connection of the tool 70 to the spindle 36 may be tight with the tool 70 and spindle 36 in required relative angular orientations without special draw bar tolerance.

Figure 4:
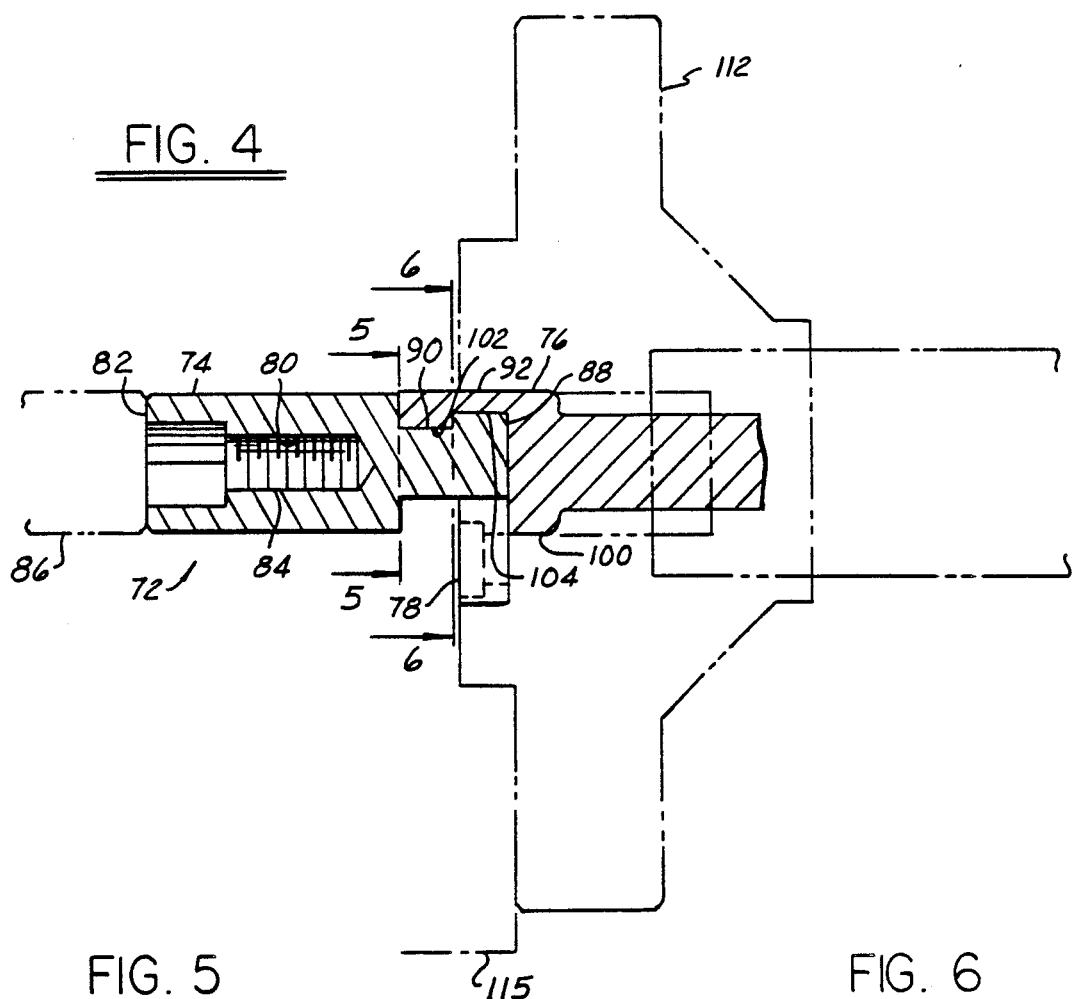
FIG. 4 is a longitudinal section view of another embodiment of the draw bar adapter structure of the invention for practicing the method of the invention.

The draw bar adapter structure 72 shown in FIG. 4 includes a coupling member 74, a modified tool draw bar 76 and a keeper member 78.

The coupling member 74 again has an internally threaded recess 80 in end 82 thereof into which the threaded end 84 of the machine tool draw bar 86 is positioned. The other end 88 of the coupling member 74 has a reduced diameter cylindrical portion 90 and a head 92 defined by two parallel spaced apart substantially straight sides 94 and 96 extending tangentially from the opposite sides of the reduced diameter cylindrical portion 90 of the coupling member 74 and a larger diameter arcuate portion 98 as shown in FIG. 5.

Figure 5:
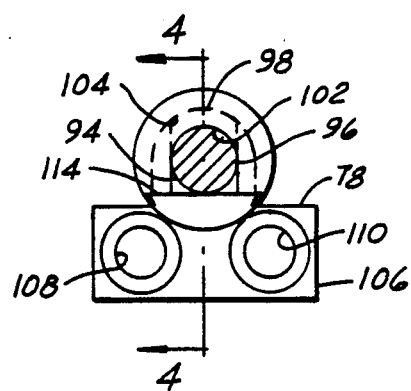
FIG. 5 is a cross-section of the structure of FIG. 4 taken substantially on the line 5—5 in FIG. 4 and showing the keeper member in place on the tool shown.
Figure 6:
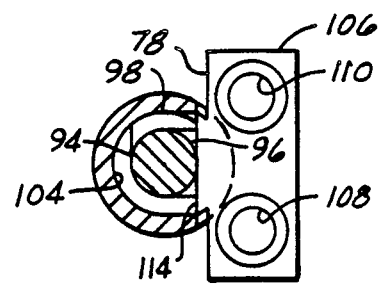
FIG. 6 is a cross-section of the draw bar adapter structure shown in FIG. 4 taken substantially on the line 6—6 in FIG. 4 with the adapter structure and tool rotated 90° with respect to each other as shown in FIG. 4.

The modified tool draw bar 76 includes a large diameter end 100 on the tool draw bar having a U-shaped opening 102 therein as shown best in FIG. 5 and further having the radially larger U-shaped recess 104 therein as best shown in FIG. 6. The opening 102 receives the cylindrical portion 90 of the coupling member 74 while the recess 104 receives the head 92 of the coupling member 74 as shown in FIG. 4.

The keeper 78 includes the rectangular portion 106 having openings 108 and 110 extending therethrough to receive bolts securing the keeper 78 to the tool 112. The keeper 78 is also provided with the cylindrical segment 114 which with the keeper 78 in position on the tool 112 as shown in FIG. 4 extends across the recess 104 at substantially the same diameter as the cylindrical portion 90 of the coupling member 74 whereby the relative rotation between the coupling member 74 and the tool draw bar 76 is limited to approximately 180°.

Again, with the coupling member 74 secured to the tool draw bar 76 by means of the keeper 78 as shown in FIG. 4, the tool 112 is rotated to tightly secure the coupling member 74 to the draw bar 86 after which the tool 112 may be reversely rotated 180° to align the means securing the tool 112 to the spindle. The tool is thus secured to the spindle with the draw bar 76 and 86 tightly connected through the coupling member 74.

While one embodiment of the present invention has been considered in detail, it will be understood that other embodiments and modifications of the invention are contemplated by the inventors. It is the intention to include all modifications and embodiments of the invention as are defined by the appended claims within the scope of the invention.

I claim:

1. Structure for tightly securing a tool including a tool draw bar carried by and movable axially of the tool, to a spindle through which an actuating draw bar movable axially of the spindle passes, with the tool and spindle in predetermined relative angular positions and in surface to surface contact and the draw bars tightly connected against relative axial movement, comprising means operable between the actuating draw bar and tool for tightly securing the tool draw bar to the actuating draw bar with the tool and spindle in surface to surface contact including means for precluding relative axial movement between the tool and spindle draw bars with the tool and spindle in surface to surface contact and means for permitting limited relative rotation between the tool and spindle in surface to surface contact with the tool draw bar tightly secured to the actuating draw bar precluding relative axial movement between the draw bars.

2. Structure as set forth in claim 1, wherein the means permitting relative rotation between the tool and spindle permits relative rotation between the tool and spindle up to substantially 180°.

3. Structure as set forth in claim 1, wherein the means for securing the tool draw bar to the actuating draw bar is a separate adapter placed between the tool draw bar and actuating draw bar.

4. Structure as set forth in claim 3, wherein the separate adapter includes a first cylindrical coupling member having internal threads in one end thereof adapted to receive a threaded actuating draw bar end and having an externally threaded other end for receiving a second coupling member positioned between the first coupling member and tool and pin means extending through the first coupling member and threaded end of the actuating draw bar to prevent relative rotation between the first coupling member and the threaded end of the draw bar in assembly.

5. Structure as set forth in claim 4, and further including a second cylindrical coupling member having a dual diameter central opening providing an internal annular abutment surface therein, the larger end of which is threaded to receive the externally threaded other end of the first coupling member whereby an annular groove is provided between the other end of the first coupling member and the annular abutment surface in the second coupling member for receiving a bolt head or the like therein.

6. Structure as set forth in claim 5, wherein the means for securing the tool draw bar to the actuating draw bar further includes a bolt having a head positioned within the annular groove and adapted to extend out of the second coupling member and into the tool draw bar to secure the tool draw bar to the second coupling member, while permitting relative rotation therebetween.

7. Structure for tightly securing a tool including a draw bar to a spindle through which an actuating draw bar passes with the tool and spindle in predetermined relative angular position, comprising means operable between the actuating draw bar and tool for tightly securing the tool draw bar to the actuating draw bar including means permitting relative rotation between the tool and spindle with the tool draw bar and actuating draw bar tightly connected comprising a single coupling member, and a modified tool draw bar and means operable therebetween for tightly securing the coupling member and modified tool draw bar together against relative axial movement while permitting limited relative angular movement therebetween, said coupling member including a threaded recess in one end thereof for receiving a threaded end on the actuating draw bar and a reduced diameter cylindrical other end including a headed portion thereon defined by parallel, tangentially extending sides separated by 180° of arc of the headed portion and a larger diameter portion extending between the parallel sides, said modified tool draw bar including an annular transversely extending internal recess in the end thereof for receiving the headed portion of the coupling member to limit relative axial movement between the coupling member and tool draw bar and a keeper member secured to said tool to provide a substantially straight abutment across said annular recess in the modified tool draw bar at the reduced diameter of the coupling member to limit relative angular movement between the tool draw bar and the coupling member to approximately 180°.

8. Structure for tightly securing a tool including a draw bar carried by and movable axially of the tool to a spindle through which an actuating draw bar movable axially of the spindle passes with the tool and spindle in predetermined relative angular positions and the draw bars tightly connected, comprising means operable between the actuating draw bar and tool for tightly securing the tool draw bar to the actuating draw bar including a single coupling member, and a modified tool draw bar and means operable therebetween for tightly securing the coupling member and modified tool draw bar together against relative axial movement while permitting limited relative angular rotation between the tool and spindle with the tool draw bar and actuating draw bar tightly connected without loosening the securing of the coupling member and modified tool draw bar.

9. Structure as set forth in claim 8, wherein the coupling member includes a threaded recess in one end thereof for receiving a threaded end on the actuating draw bar and having a reduced diameter cylindrical other end including a headed portion thereon defined by parallel tangentially extending sides separated by 180° of arc of the headed portion and a larger diameter portion extending between the parallel sides.

10. Structure as set forth in claim 9, wherein the modified tool draw bar includes an annular transversely extending internal recess in the end thereof for receiving the head portion of the coupling member to limit relative axial movement between the coupling member and tool draw bar.

11. Structure for tightly securing a tool including a draw bar carried by and movably axially of the tool to a spindle through which an actuating draw bar movable axially of the spindle passes with the tool and spindle in predetermined relative angular positions, comprising means operable between the actuating draw bar and tool for tightly securing the tool draw bar to the actuating draw bar including means permitting relative rotation between the tool and spindle with the tool draw bar and actuating draw bar tightly connected wherein the means for securing the tool draw bar to the actuating draw bar is a separate adapter placed between the tool draw bar and the actuating draw bar, the separate adapter including a first cylindrical coupling member having internal threads in one end thereof adapted to receive a threaded actuating draw bar end and having an externally threaded other end for receiving a second coupling member positioned between the first coupling member and tool and pin means extending through the first coupling member and threaded end of the actuating draw bar to prevent relative rotation between the first coupling member and the threaded end of the draw bar in assembly and a second cylindrical coupling member having a dual diameter central opening providing an internal annular abutment surface therein, the larger end of which is threaded to receive the externally threaded other end of the first coupling member whereby an annular groove is provided between the other end of the first coupling member and the annular abutment surface in the second coupling member for receiving a bolt head or the like therein and wherein the means for securing the tool draw bar to the actuating draw bar further includes a bolt having a head positioned within the annular groove and adapted to extend out of the second coupling member and into the tool draw bar to secure the tool draw bar to the second coupling member, while permitting relative rotation therebetween, and the means for securing the tool draw bar to the actuating draw bar further includes a pin extending transversely across the second coupling member within the annular groove therein defining a maximum obstruction free diameter within the annular groove and wherein the head of the bolt is defined over one half thereof by the obstruction free diameter and is further defined by parallel sides extendings tangentially from the periphery of the head at spaced apart points on the head separated by 180° and the largest diameter of the annular groove.

12. The method of securing a tool, having a tool draw bar carried by and movable axially of the tool to a spindle having an actuating draw bar movable axially thereof, therein comprising, securely securing the tool draw bar to the actuating draw bar by rotating the tool relative to the spindle in one direction until the tool and spindle are in surface to surface contact precluding relative axial movement between the tool and spindle and the draw bars, subsequently reversely rotating the tool relative to the spindle with the tool and spindle in surface to surface contact and without loosening the connection between the draw bars to angularly align the tool with the spindle, and then securing the tool to the spindle.

13. The method as set forth in claim 12, wherein the tool is rotated relative to the spindle without relative axial movement between the tool and spindle up to 180°.

* * * * *